(12) United States Patent
Chae

(10) Patent No.: US 11,237,553 B2
(45) Date of Patent: Feb. 1, 2022

(54) REMOTE CONTROL DEVICE AND METHOD THEREOF

(71) Applicant: HANWHA DEFENSE CO., LTD., Changwon-si (KR)

(72) Inventor: Hee Seo Chae, Changwon-si (KR)

(73) Assignee: HANWHA DEFENSE CO., LTD., Changwon-si (KR)

( * ) Notice: Subject to any disclaimer, the term of this patent is extended or adjusted under 35 U.S.C. 154(b) by 88 days.

(21) Appl. No.: 16/842,161

(22) Filed: Apr. 7, 2020

(65) Prior Publication Data
US 2021/0200202 A1 Jul. 1, 2021

(30) Foreign Application Priority Data
Dec. 30, 2019 (KR) .................. 10-2019-0178513

(51) Int. Cl.
*G05D 1/00* (2006.01)

(52) U.S. Cl.
CPC ......... *G05D 1/0016* (2013.01); *G05D 1/0027* (2013.01); *G05D 1/0038* (2013.01)

(58) Field of Classification Search
CPC .. G05D 1/0016; G05D 1/0038; G05D 1/0027; G05D 1/0291; G06F 3/0484; G06F 3/033; G06F 3/013

USPC ............................................................. 701/2
See application file for complete search history.

(56) References Cited

U.S. PATENT DOCUMENTS

| 2020/0004332 A1* | 1/2020 | Jeon | G06K 9/00671 |
| 2020/0043239 A1* | 2/2020 | Lee  | G06K 9/00671 |

FOREIGN PATENT DOCUMENTS

| KR | 10-1620983 B1 | 5/2016 |
| KR | 10-1832593 B1 | 2/2018 |
| KR | 10-2019-0098925 A | 8/2019 |
| KR | 10-2019-0109336 A | 9/2019 |
| KR | 20190115506 A * | 10/2019 |

* cited by examiner

*Primary Examiner* — Muhammad Shafi
(74) *Attorney, Agent, or Firm* — Sughrue Mion, PLLC (57) ABSTRACT

A remote control device includes: a display configured to receive a driving image and a monitoring image from each of N mobile robots, such that N driving images and M monitoring images are received, and to display the received N driving images and M monitoring images; a sensor configured to track a gaze of a user; and a controller configured to provide a control right to the user for a first robot of the N mobile robots as a master mobile robot based on the gaze of the user being tracked by the sensor as staying on the driving image or the monitoring image of the first robot displayed on the display.

18 Claims, 10 Drawing Sheets

REMOTE CONTROL DEVICE AND METHOD THEREOF

CROSS-REFERENCE TO THE RELATED APPLICATION

This application claims priority from and is based on Korean Patent Application No. 10-2019-0178513, filed on Dec. 30, 2019, in the Korean Intellectual Property Office, the disclosure of which is incorporated herein in its entirety by reference.

BACKGROUND

1. Field

One or more embodiments relate to a method of collective-controlling a remote unmanned mobile robot, an unmanned mobile vehicle, an unmanned mobile aircraft, and the like, with the eyes of a single user using a single operating device.

2. Description of the Related Art

Many unmanned robot-remote control systems have been studied in which an operator selects a robot to be remotely controlled and remotely driven while looking at a driving camera of the robot. However, since a method for the operator to control only a single robot using a single operating device has been studied, a need for collective control of robots and automobiles is increasing.

SUMMARY

One or more embodiments include a method in which an operator looks at a single operation screen and simultaneously performs collective control on a number of unmanned mobile objects using a gaze.

Additional aspects will be set forth in part in the description which follows and, in part, will be apparent from the description, or may be learned by practice of the presented embodiments of the disclosure.

According to one or more embodiments, a remote control device is provided, the remote control device comprising: a display configured to receive a driving image and a monitoring image from each of N mobile robots, such that N driving images and M monitoring images are received, and to display the received N driving images and M monitoring images; a sensor configured to track a gaze of a user; and a controller comprising at least one processor, the controller configured to: provide a control right to the user for a first robot of the N mobile robots as a master mobile robot based on the gaze of the user being tracked by the sensor as staying on the driving image or the monitoring image of the first robot displayed on the display; and based on the user selecting, via the display, one of the N driving images or one of the M monitoring images, other than the driving image and the monitoring image of the first robot that is the master mobile robot, within a certain time after the user is provided the control right of the master mobile robot, perform collective control of the master mobile robot and another mobile robot from which the selected driving image or the selected monitoring image was received.

According to an embodiment, the display is configured to: when the gaze of the user is tracked by the sensor as staying on the driving image of the first robot displayed on the display, provide an interface to the user to select one of the N driving images, other than the driving image from the first robot that is the master mobile robot.

According to an embodiment, the display is configured to: when the gaze of the user is tracked by the sensor as staying on the monitoring image of the first robot displayed on the display, provide an interface to the user to select one of the M monitoring images, other than the monitoring image from the first robot that is the master mobile robot.

According to an embodiment, the controller is configured to perform the collective control of the master mobile robot and the another mobile robot, corresponding to the driving image selected via the interface, such that the master mobile robot and the another mobile robot move to a point corresponding to where the gaze of the user is tracked by the sensor moves on the driving image of the master mobile robot that is displayed on the display.

According to an embodiment, the controller is configured to collectively control driving of the master mobile robot and the another mobile robot, corresponding to the driving image selected via the interface, based on an input from a joystick.

According to an embodiment, the controller is configured to perform the collective control of the master mobile robot and the another mobile robot, corresponding to the monitoring image selected via the interface, such that the master mobile robot and the another mobile robot move to a point corresponding to where the gaze of the user is tracked by the sensor moves on the monitoring image of the master mobile robot that is displayed on the display.

According to an embodiment, the controller enables the master mobile robot and the another mobile robot, corresponding to the monitoring image selected via the interface, to perform shooting in a collective control method using a joystick.

According to an embodiment, the controller is configured to provide the control right to the user for the first robot as the master mobile robot at a time t1 based on the gaze of the user being tracked by the sensor as staying on a first image that is the driving image or the monitoring image of the first robot displayed on the display, and when the gaze of the user tracked by the sensor at a time t2 moves and stays for more than a preset time on a second image that is the driving image or the monitoring image of a second robot of the N mobile robots displayed on the display, set the second robot as the master mobile robot.

According to an embodiment, the controller is configured to: revoke the control right of the first robot, at the time t2, based on one of the first image of the first robot and the second image of the second robot being a driving image and the other of the first image of the first robot and the second image of the second robot being a monitoring image, and maintain collective control rights of the first robot and the second robot, at the time t2, based both of the first image of the first robot and the second image of the second robot being a same type from among a driving image and a monitoring image.

According to an embodiment, the controller causes the display to display identification information indicating each of the N driving images and each of the M monitoring images displayed on the display that correspond to the master mobile robot or the another mobile robot of which the controller performs the collective control.

According to an embodiment, the controller is configured to determine the one of the N driving images or the one of the M monitoring images is selected by the user based on the user touching the display.

According to one or more embodiments, a remote control method is provided, the remote control method comprises: receiving a driving image and a monitoring image from each of N mobile robots, such that N driving images and M monitoring images are received; displaying, on a display, the received N driving images and M monitoring images; tracking, via a sensor, a gaze of a user; providing a control right to the user for a first robot of the N mobile robots as a master mobile robot based on the gaze of the user being tracked by the sensor as staying on the driving image or the monitoring image of the first robot displayed on the display; and performing, based on the user selecting, via the display, one of the N driving images or one of the M monitoring images, other than the driving image and the monitoring image of the first robot that is the master mobile robot, within a certain time after the user is provided the control right of the master mobile robot, collective control of the master mobile robot and another mobile robot from which the selected driving image or the selected monitoring image was received.

According to an embodiment, the remote control method further comprises activating, in a case where the gaze of the user is tracked by the sensor as staying on the driving image of the first robot displayed on the display, a first interface to the user to select one of the N driving images, other than the driving image from the first robot that is the master mobile robot; and activating, in a case where the gaze of the user is tracked by the sensor as staying on the monitoring image of the first robot displayed on the display, a second interface to the user to select one of the M monitoring images, other than the monitoring image from the first robot that is the master mobile robot.

According to an embodiment, the remote control method further comprises performing collective control of the master mobile robot and the another mobile robot, corresponding to the driving image selected via the first interface, such that the master mobile robot and the another mobile robot move to a point corresponding to where the gaze of the user is tracked by the sensor moves on the driving image of the master mobile robot that is displayed on the display.

According to an embodiment, the remote control method further comprises performing collective control of the master mobile robot and the another mobile robot, corresponding to the monitoring image selected via the second interface, such that the master mobile robot and the another mobile robot shoot a point corresponding to where the gaze of the user is tracked by the sensor moves on the driving image of the master mobile robot that is displayed on the display.

According to an embodiment, the providing the control right to the user for the first robot as the master mobile robot is at a time t1, and the remote control method further comprises: setting, in a case where the gaze of the user tracked by the sensor moves and stays at a time t2 for more than a preset time on the driving image or the monitoring image of a second robot of the N mobile robots displayed on the display, the second robot as the master mobile robot.

According to one or more embodiments, a non-transitory computer readable medium is provided, the non-transitory computer readable medium comprising computer instructions that are configured to, when executed by at least one processor, cause the at least one processor to: display, via a display, N driving images and M monitoring images that are received, the N driving images and M monitoring images including a driving image and a monitoring image from each of N mobile robots; track, via a sensor, a gaze of a user; provide a control right to the user for a first robot of the N mobile robots as a master mobile robot based on the gaze of the user being tracked by the sensor as staying on the driving image or the monitoring image of the first robot displayed on the display; and perform, based on the user selecting, via the display, one of the N driving images or one of the M monitoring images, other than the driving image and the monitoring image of the first robot that is the master mobile robot, within a certain time after the user is provided the control right of the master mobile robot, collective control of the master mobile robot and another mobile robot from which the selected driving image or the selected monitoring image was received.

According to an embodiment, the computer instructions are further configured to, when executed by the at least one processor, cause the at least one processor to: activate, in a case where the gaze of the user is tracked by the sensor as staying on the driving image of the first robot displayed on the display, a first interface to the user to select one of the N driving images, other than the driving image from the first robot that is the master mobile robot; and activate, in a case where the gaze of the user is tracked by the sensor as staying on the monitoring image of the first robot displayed on the display, a second interface to the user to select one of the M monitoring images, other than the monitoring image from the first robot that is the master mobile robot.

According to an embodiment, the computer instructions are further configured to, when executed by the at least one processor, cause the at least one processor to: perform the collective control of the master mobile robot and the another mobile robot, corresponding to the driving image selected via the first interface, such that the master mobile robot and the another mobile robot move to a point corresponding to where the gaze of the user is tracked by the sensor moves on the driving image of the master mobile robot that is displayed on the display.

According to an embodiment, the computer instructions are further configured to, when executed by the at least one processor, cause the at least one processor to: perform the collective control of the master mobile robot and the another mobile robot, corresponding to the monitoring image selected via the second interface, such that the master mobile robot and the another mobile robot shoot a point corresponding to where the gaze of the user is tracked by the sensor moves on the driving image of the master mobile robot that is displayed on the display.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Figure 1:
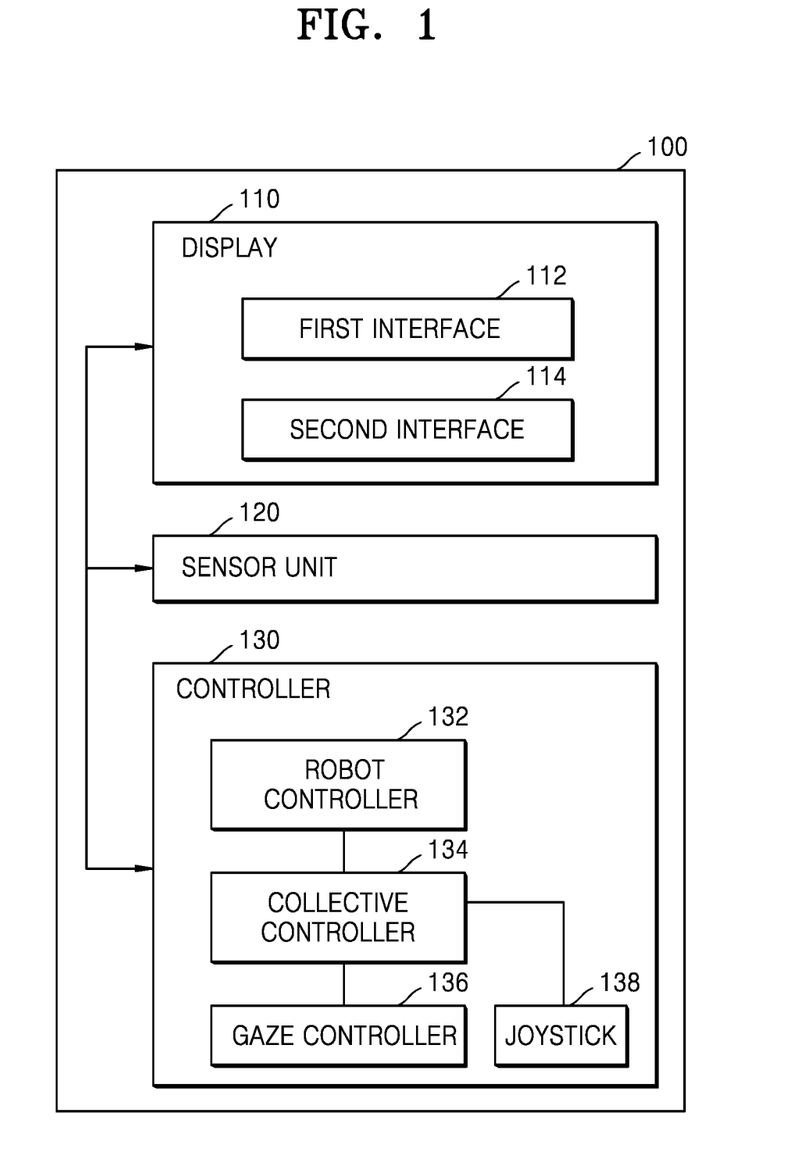
FIG. 1 is an internal configuration diagram of a remote control device of an embodiment.

FIG. 1 is an internal configuration diagram of a remote control device 100 according to an embodiment. The remote control device 100 refers to a device for remotely controlling a mobile robot, an unmanned vehicle, an unmanned aircraft, and the like.

In an embodiment, the remote control device 100 may select one or more mobile objects including a mobile robot, an unmanned vehicle, an unmanned aircraft, etc. to be controlled remotely using an operator's gaze and may obtain a control right of the one or more selected objects to remotely control the objects. In an embodiment, the remote control device 100 remotely controls, collectively, a plurality of robots by using a pre-registered user's gaze.

Figure 6:
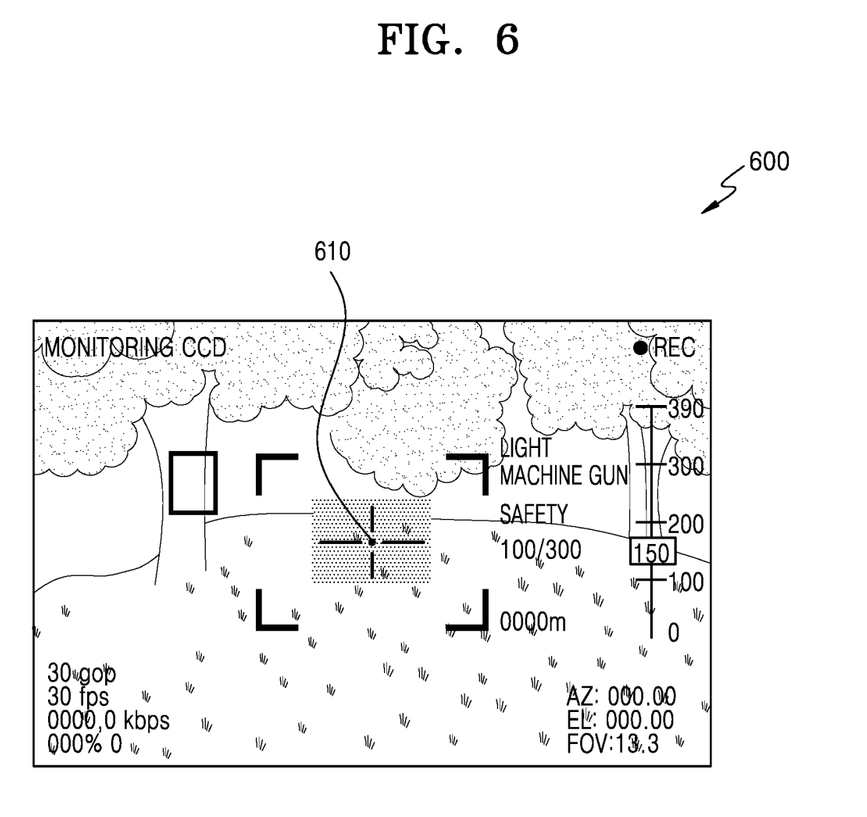
FIG. 6 is a view of a driving image according to an embodiment.
Figure 7:
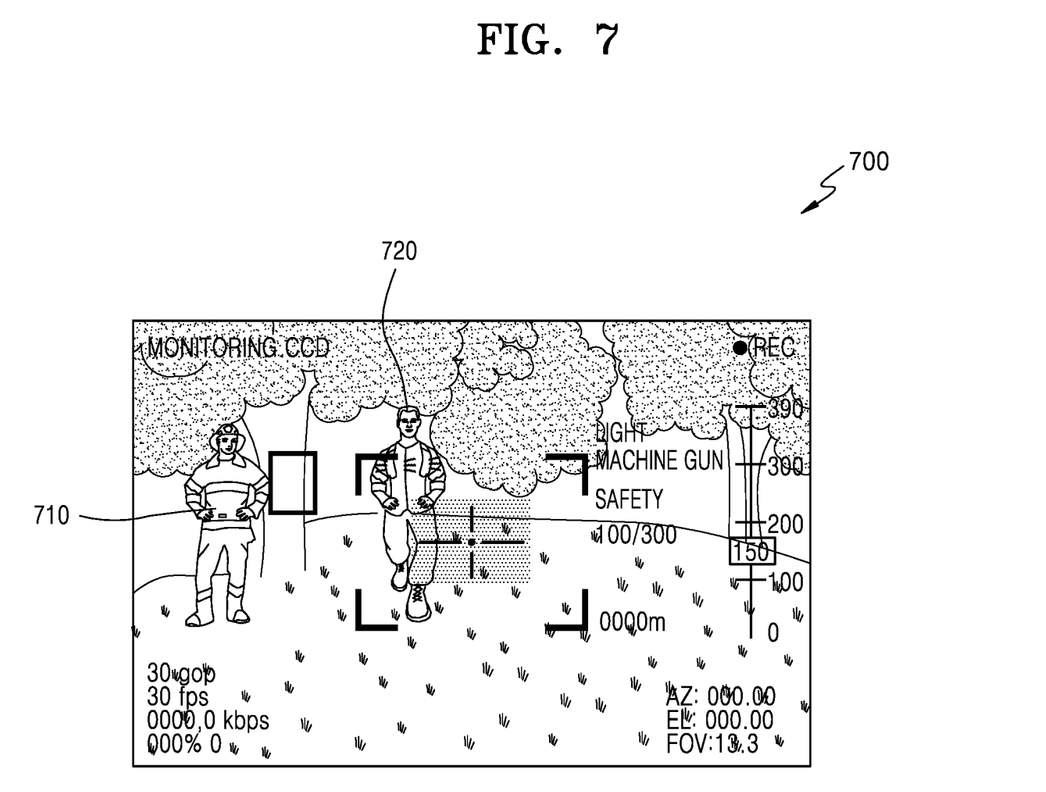
FIG. 7 illustrates an example of a monitoring image.

In an embodiment, a mobile object may be controlled according to a control signal of the remote control device 100. In an embodiment, the control includes tasks such as autonomous driving, target driving, monitoring, shooting, and the like. As in an embodiment illustrated in FIG. 8, a mobile object 810 includes a vehicle controller (VCU) 811, which receives commands from the remote operator and relays them to the mobile object 810 and performs main control. The mobile object 810 may also include a power drive unit 812, an autonomous device module 813, a communicator 814 for wirelessly providing an image to the remote control device, a driving camera 820 for obtaining a driving image 600 of a mobile object as, for example, illustrated in FIG. 6, and a monitoring camera 830 for obtaining a monitoring image 700 as, for example, illustrated in FIG. 7. The driving image 600 may be an image corresponding to the driving direction of the mobile object (e.g. a front casing direction of the mobile object), and may include an indicator 610 representing the direction in which the mobile object is facing. In addition, the mobile object 810 may further include monitoring and armed devices in one or more module forms as needed. In addition, the mobile object 810 may further include one or more wheel 815.

Figure 8:
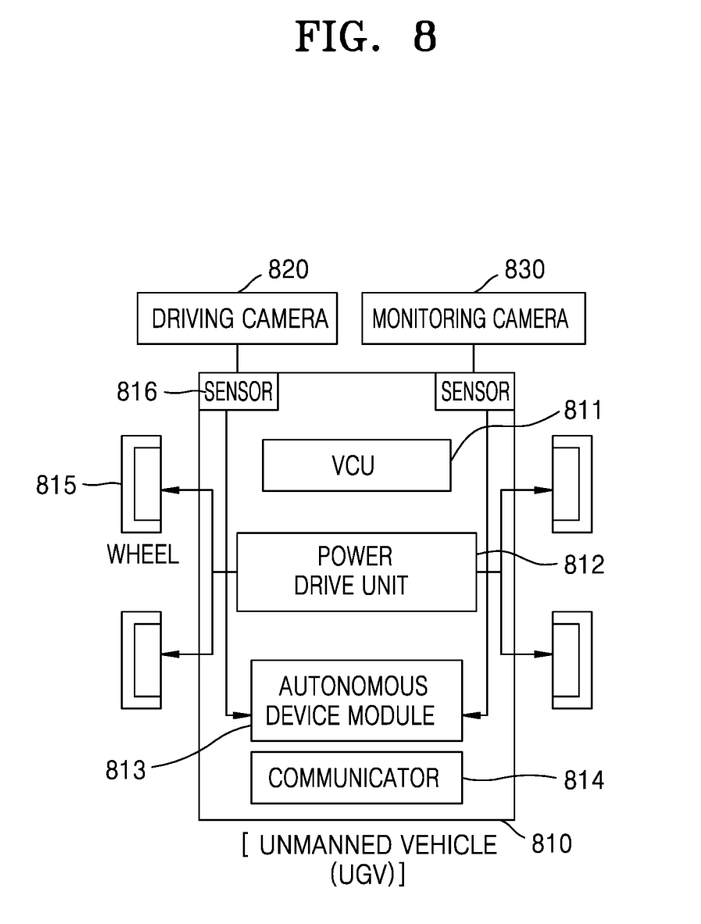
FIG. 8 is an internal configuration diagram of a mobile object, according to an embodiment.

According to an embodiment, the monitoring camera 830 may have pan, tilt and zoom functions and may be equipped with an IR sensor. The driving camera 820 may be implemented in a form in which the pan, tilt, and zoom functions are not supported.

In an embodiment, with reference to FIG. 1, the remote control device 100 includes a display 110, a sensor unit 120, and a controller 130. In addition, the remote control device 100 includes a communicator for performing wired or wireless communication with a mobile robot, an unmanned vehicle, an unmanned aircraft, an autonomous driving device, or the like.

Figure 2:
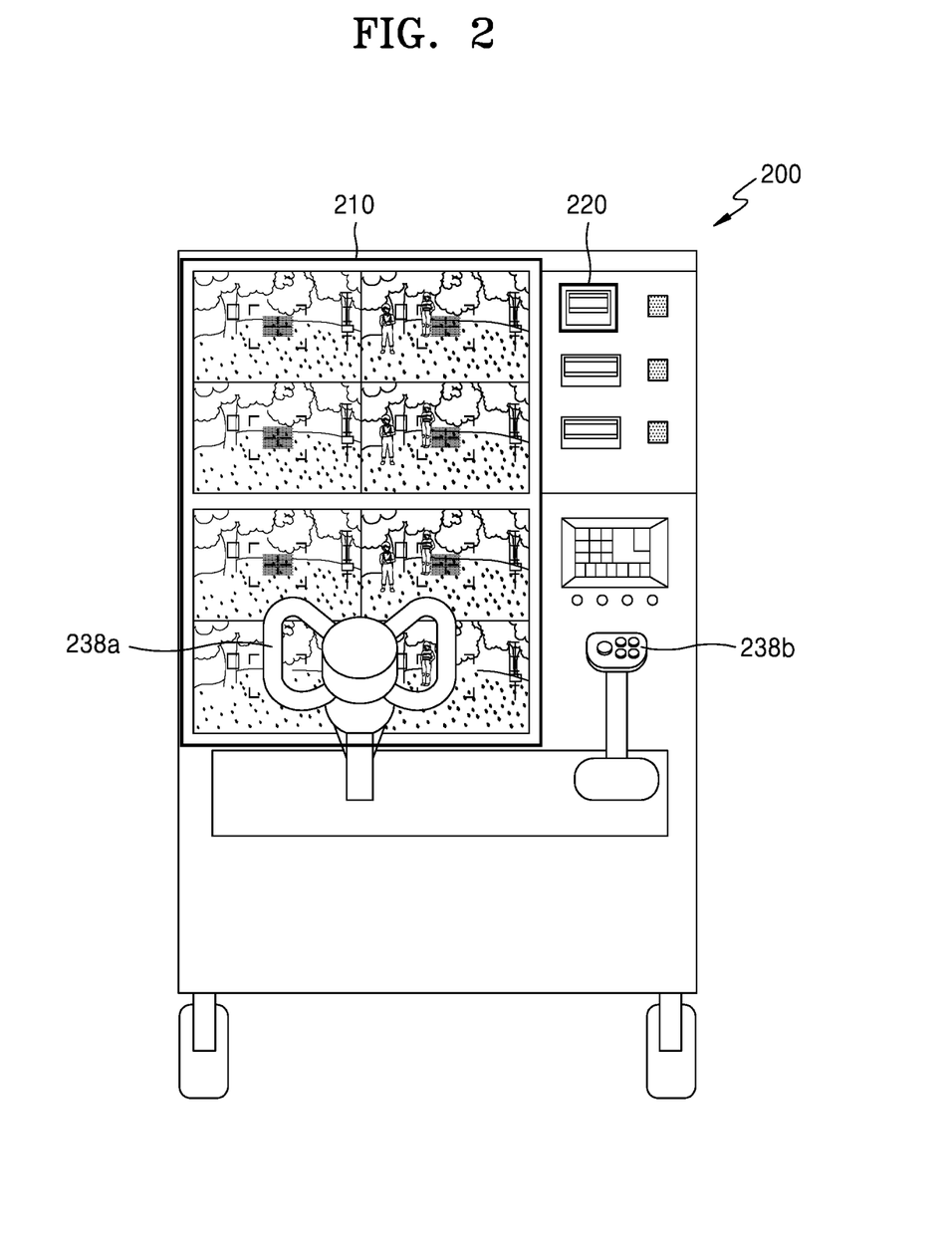
FIG. 2 is a view of an actual implementation of the remote control device according to the embodiment.

The display 110 may be controlled by the controller 130 to display. The display 110 may divide a screen into regions and display images received by at least one image photographing device in the divided regions of the screen, respectively. The display 110 may display a plurality of monitoring images and a plurality of driving images respectively received from a plurality of monitoring cameras and a plurality of driving cameras on one screen. Referring to FIG. 2, a plurality of monitoring images and driving images may be displayed on a display 210. The display 210 may correspond to the display 110 of FIG. 1. In FIG. 2, the left columns of the display 210 may be arranged such that all monitoring images are displayed or all driving images are displayed, or all the monitoring images are sequentially displayed from the upper side of the display 210, and then the driving images may be displayed thereafter. Alternatively, the driving images and the monitoring images may be randomly arranged on the display 210, or may be respectively arranged in an order according to a user. The display 210, that corresponds to the display 110, may also support a scrolling interface.

In an embodiment, the display 110 may provide a first interface 112 and a second interface 114. The first interface 112 activates only at least one driving image displayed on the display 110. When the first interface 112 is activated, a user may select only at least one driving image among the at least one driving image and at least one monitoring image displayed on the display 110. For example, the at least one monitoring image may not be selectable. Also, the at least one monitoring image may not be displayed on the display 110.

The second interface 114 activates only at least one monitoring image displayed on the display 110. When the second interface 114 is activated, a user may select only at least one monitoring image among at least one driving image and the at least one monitoring image displayed on the display 110. For example, the at least one driving image may not be selectable. Also, the at least one driving image may not be displayed on the display 110.

The display 110 may be a touch display and the controller 130 may be configured to determine which images are selected based on a touch(es) of the user on the display 110.

In an embodiment, the sensor unit 120 may include all of various types of sensors such as a rider sensor and a radar sensor. In addition, the sensor unit 120 includes a sensor for tracking eye movement of a user or sensing the direction of a user's gaze. Referring to FIG. 2, the sensor unit 220, which may correspond to the sensor unit 120, may track the eye movement of the user or movement of the user's gaze.

The controller 130 may control driving, monitoring, and shooting of selected mobile robots, and includes a robot controller 132, a collective controller 134, a gaze controller 136, and a joystick 138. The controller 130 may be implemented with at least one processor and memory storing computer instructions, where the computer instructions, when executed by the at least one processor, are configured to cause the controller 130 to perform its functions.

The robot controller 132 provides a control right for a mobile robot within a point where a user's gaze sensed by the sensor unit 120 of the remote control device 100 stays on the display 110. Then, the mobile robot provided with the control right is set as a master mobile robot.

The robot controller 132, when the user's gaze is directed to an image on the display 110 corresponding to a robot's gaze, also provides a control right to the user for the robot. The robot controller 132 may set times for which the user's gaze is to be directed to a driving image of a robot and a monitoring image of a robot, respectively, for setting the robot as a master mobile robot.

When the time at which the user's gaze is directed to a driving image on the display 110 corresponding to the robots gaze is ta for setting the robot corresponding to the driving image as the master mobile robot, the robot controller 132 may request tb time as the time at which the user's gaze is to be directed to a monitoring image on the display 110 corresponding to the robot's gaze for setting the robot corresponding to the monitoring image as the master mobile robot. In this case, tb>ta.

In an embodiment, the master mobile robot refers to a mobile object that serves as a master when collective-controlling at least one mobile robot or mobile object. For example, when four mobile robots are collective-controlled, a user stares at a screen region of the display 110 corresponding to an image received from the master mobile robot and the other three mobile robots follow the master mobile robot. In this case, each of the mobile robots may be preset with a distance and arrangement with respect to each other so as to maintain a stable formation when driving, monitoring, or shooting considering a relative distance from the master mobile robot.

In an embodiment of the present disclosure, the other three mobile robots sequentially follow the master mobile robot according to the distance from the master mobile robot. When the master mobile robot is disqualified and a new master robot is set, the mobile robots follow the new master mobile robot.

Figure 3:
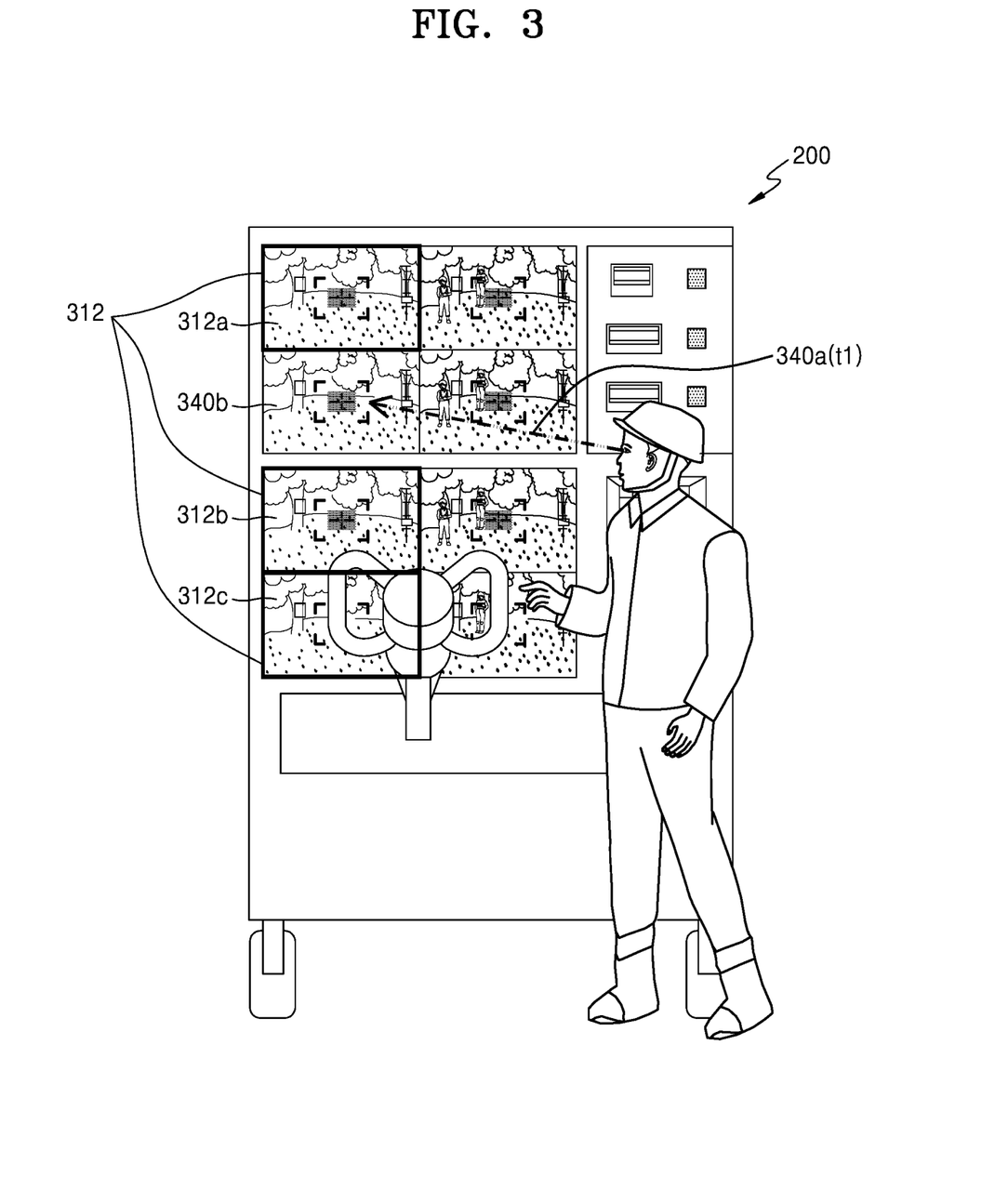
FIG. 3 is a view of an example in which a first or second interface is activated according to an embodiment.

Referring to an embodiment of FIG. 3, the robot controller 132 may set a mobile robot as a master mobile robot and may provide a control right when a user's gaze stays on image 340b of a display for a certain time or more at a time t1, wherein the image 340b is an image from the mobile robot. A user receives the control right for the mobile robot set as the master mobile robot, and may control the master mobile robot with a gaze via the gaze controller 136 or by using the joystick 138. The remote control device 100 may be implemented as a remote control device 200. Referring to FIG. 2, the remote control device 200 may support one or more joysticks, for example, a driving joystick 238a and a monitoring joystick 238b. For example, the remote control device 200 may support the driving joystick 238a and the monitoring joystick 238b. A user, with respect to the mobile robot of which the user obtained the control right, may perform driving by using the driving joystick 238a or may perform monitoring and shooting by using the monitoring joystick 238b. In the case of a mobile robot in autonomous driving, the user may cause the mobile robot to perform autonomous driving and further control the mobile robot to perform monitoring and shooting by using the monitoring joystick 238b.

Figure 5:
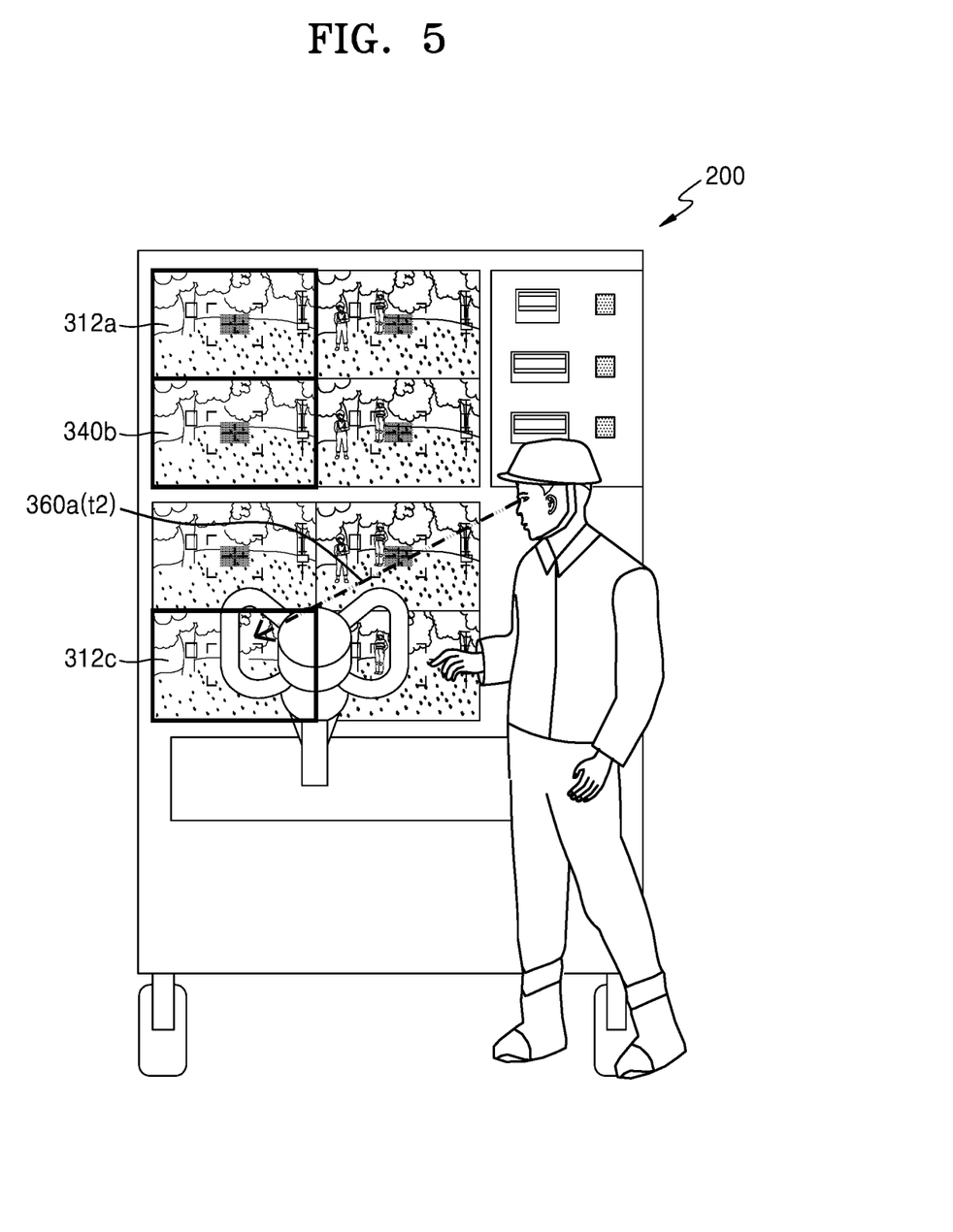
FIG. 5 is a view of changing a master mobile robot, according to an embodiment.

Referring further to an embodiment of FIG. 5, when a user's gaze 360a stays at a specific point on a display, corresponding to an image from a mobile robot displayed on the display, for a certain time or more at a time t2, the robot controller may select the mobile robot and may provide a control right to the user for the mobile robot. For example, when the user's gaze stays on image 312c of a mobile robot, the robot controller 132 may select the mobile robot corresponding to image 312c.

In this case, when an image of a view of a first mobile robot set as the master mobile robot at the time t1 is a driving image and an image of a view of a second mobile robot that is reset as a master mobile robot at the time t2 is also a driving image, a user may obtain control right for collective-controlling both the second mobile robot reset as the master mobile robot at the time t2 and the first mobile robot set as the master mobile robot at the time t1.

In another embodiment, the user may obtain only the control right for the second mobile robot reset as the master mobile robot at the time t2 and may lose the control right for the first mobile robot set as the master mobile robot at the time t1. In this case, the first mobile robot of the time t1 performs the previously set mission again, and the user obtains a new control right for the second master mobile robot of the time t2.

Also, when an image corresponding to the first mobile robot, set as the master mobile robot at the time t1, is a monitoring image and an image of the second mobile robot, reset as a master mobile robot at the time t2, is also a monitoring image, a user may obtain, via the controller 130, control rights for collective-controlling both the second mobile robot reset as the master mobile robot at the time t2 and the first mobile robot set as the master mobile robot at the time t1. Alternatively, the user may obtain, by the controller 130, only the control right for the second mobile robot reset as the master mobile robot at the time t2 and may lose, by the controller 130, the control right for the first mobile robot set as the master mobile robot at the time t1.

In an embodiment, when the mobile robot is set as a master mobile robot based on the gaze of the user being tracked as staying on the driving image of the mobile robot displayed on the display 110, the collective controller 134 may activate the first interface 112 to select another mobile robot(s), corresponding to a driving image(s) displayed on the display, to be further controlled among mobile robots and may provide a control right for collective-controlling the selected mobile robot(s) and the master mobile robot. In other words, the user may select at least one of the remaining driving images other than the driving image from which the master mobile robot is detected among N driving images displayed on a display through the first interface 112.

Figure 4:
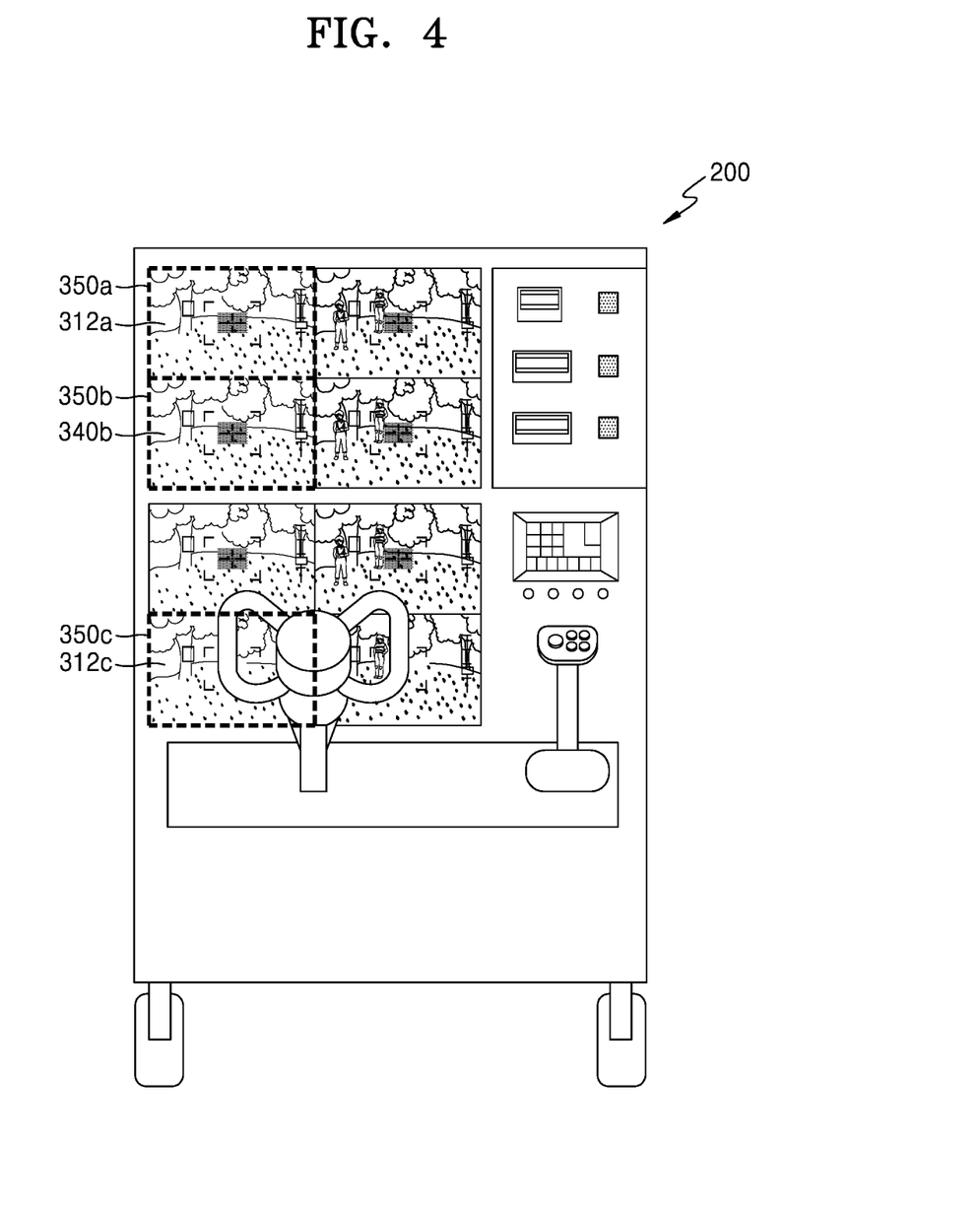
FIG. 4 is a view of an example of activating and displaying mobile objects, which are objects of collective control, in a display, according to an embodiment.

Referring to FIG. 3, assuming that an image 340b in which a user's gaze 340a at t1 stays is a driving image, a first interface 312 is implemented to activate N driving images 312a, 312b, and 312c on a display to allow a user to further select a mobile robot to collective-drive. In FIG. 3, when two driving images 312a and 312c are selected in addition to the image 340b on which a master mobile robot is displayed, as shown in an embodiment of FIG. 4, the display may indicate that mobile robots in the three driving images are selected and collective-controlled on the display (350a, 350b, and 350c). A method of displaying on the display to indicate may use a method of displaying an edge of a corresponding screen in a different color or providing information for identifying acquisition of a control right at the top of the screen. However, the disclosure is not limited thereto and various modifications are possible.

Similarly, when a collective controller assumes, or otherwise determines, that an image in which a user's gaze stays is a monitoring image, a second interface is implemented to activate M monitoring images on the display to allow a user to further select a mobile robot to collective-drive.

The collective controller may perform collective control of the master mobile robot and at least one mobile robot in at least one driving image selected through the first interface such that the master mobile robot and the at least one mobile robot move to a point where the user's gaze tracked by the sensor unit moves in a driving image that is detected to correspond to the master mobile robot.

When the mobile robot is set as a master mobile robot based on the gaze of the user being tracked as staying on the monitoring image of the mobile robot displayed on the display 110, the collective controller 134 may activate the second interface 114 to select another mobile robot(s), corresponding to a monitoring image(s) displayed on the display 110, to be further controlled among mobile robots and may provide a control right for collective-controlling the selected mobile robot(s) and the master mobile robot. In other words, a user may select at least one of the remaining monitoring images other than the monitoring image from which the master mobile robot is detected among the M monitoring images displayed on the display 110 through the second interface 114.

The collective controller 134 may use both a gaze controller 136 and a joystick 138. The collective controller 134, using the gaze controller 136, may collective-control the master mobile robot and other mobile robots to move to a specific point based on the gaze controller 136 detecting a user staring at a moving target point on a screen on which an image corresponding to the master mobile robot is displayed, when intending to move a single mobile robot or multiple mobile robots.

When monitoring is the purpose, and the gaze controller 136 detects, via the sensor unit 120, a user staring at one or more of monitoring targets 710 and 720 (see FIG. 7) on a monitoring image 700 of the master mobile robot that is displayed on the screen, the gaze controller 136 controls the master mobile robot to follow the one or more monitoring targets.

Figure 9:
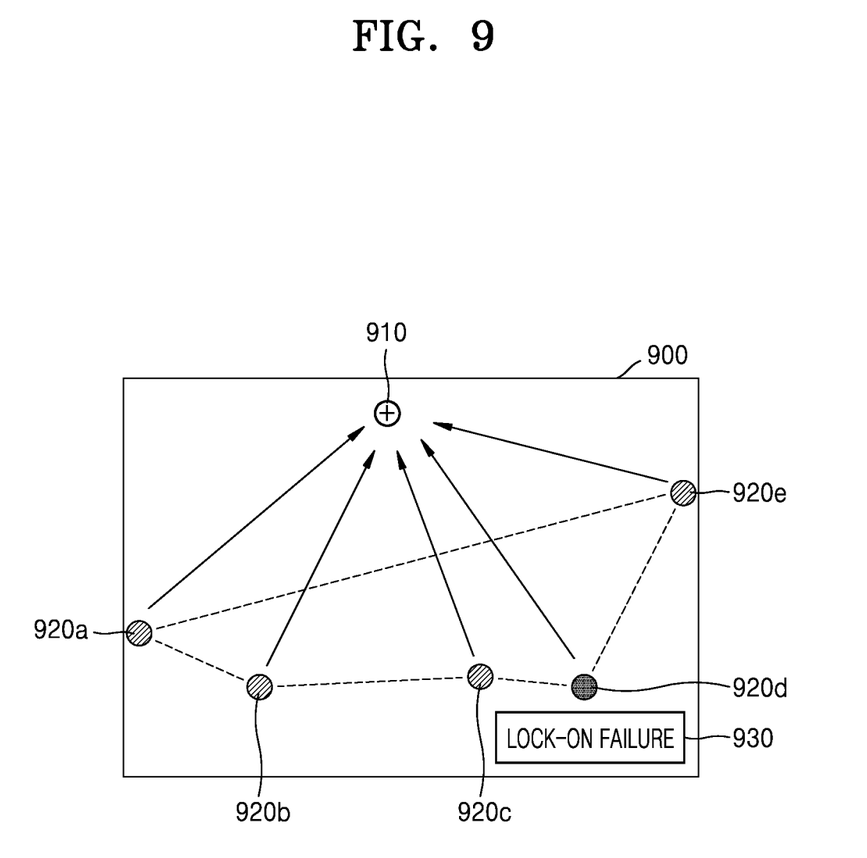
FIG. 9 is a view of an example of whether lock-on is successful before shooting when performing shooting by collective-controlling n mobile objects.

When shooting is the purpose, the gaze controller 136 interprets a certain pattern of user's eye action, like blinking an eye or providing a preset pattern signal of the eye, as user's intention to perform shooting control. The pattern signal of the eye includes, for example, the case of moving a pupil to make a specific model. Alternatively, the pattern signal of the eye includes a specific pattern such as moving the pupil left or right a certain number of times. When it is recognized that shooting is to be performed, the display 110 displays arrangement states 920a, 920b, 920c, 920d, and 920e of a plurality of mobile robots and a target point 910 to shoot as shown in an embodiment of FIG. 9 on a screen 900. In addition, the display 110 shows a message 930 on the screen 900 whether the arrangement states of the plurality of mobile robots are suitable to lock-on. Among the plurality of mobile robots, a robot that fails to lock-on displays a message such as "Lock-on failure" as the message 930, and only the remaining robots are controlled to perform shooting.

In an embodiment, the robot controller provides a control right to the user for the master mobile robot at the time t1, and when a user's gaze tracked by the sensor unit 120 moves and stays at the time t2 for more than a preset time in another image other than the image from which the master mobile robot is detected at the time t1 of the 2N images, the robot controller changes a mobile robot in the other image to a master mobile robot.

Figure 10:
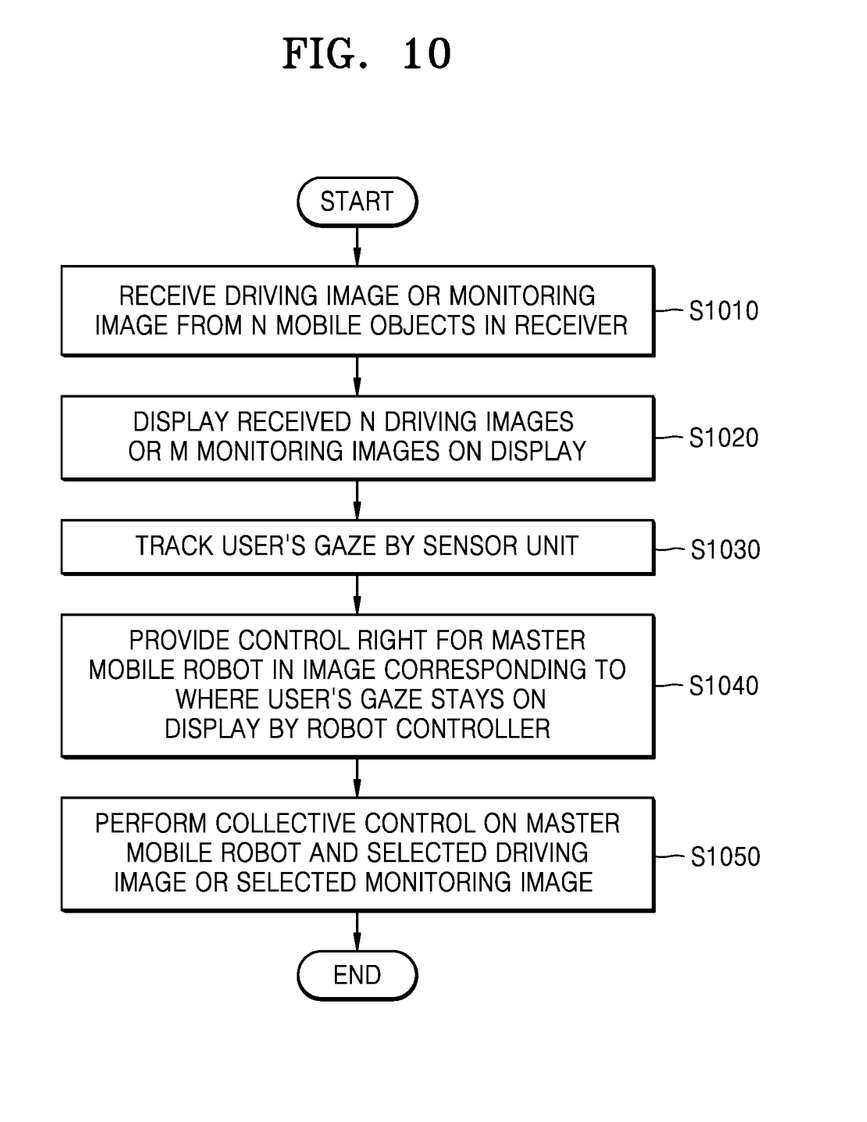
FIG. 10 is a flowchart illustrating collective control of at least one or more mobile objects by a gaze in a remote control device, according to an embodiment.

FIG. 10 shows a flowchart of a remote control method according to an embodiment.

In operation S1010, a remote control device receives a driving image or a monitoring image from N mobile objects in a receiver. Each of the N mobile objects may be, for example, an unmanned mobile robot, unmanned autonomous vehicle, or an unmanned autonomous aircraft.

In operation S1020, the remote control device displays received N driving images or M monitoring images on a display. In operation S1030, the sensor unit tracks a user's gaze to identify an image that the user is looking at among the N driving images or the M monitoring images displayed on the display.

In operation S1040, a robot controller sets a mobile object as a master mobile robot and provides a control right for the master mobile robot based on a user's gaze staying on an image of the display that corresponds to a view of the master mobile robot. When the image corresponding to the view of the master mobile robot is a driving image, at least one of driving images, except for the driving image from which the master mobile robot is detected, may be selected from the N driving images within a certain time, after receiving the control right for the master mobile robot. When the image corresponding to the view of the master mobile robot is a monitoring image, at least one of monitoring images, except for the monitoring image from which the master mobile robot is detected, may be selected from the M monitoring images within a certain time after providing the control right for the master mobile robot.

In operation S1050, a collective controller performs collective control of the master mobile robot and another robot corresponding to the selected driving image, or of the master mobile robot and another robot corresponding to the selected monitoring image.

Embodiments of the disclosure include a computer-readable recording medium containing program instructions for performing various computer-implemented operations. The computer-readable recording medium may include program commands, data files, data structures or a combination thereof. Program instructions recorded on the computer-readable recording medium may be particularly designed and structured for the present disclosure or available to those of skill in computer software. Examples of the computer-readable recording medium include magnetic media (e.g., hard discs, floppy discs, or magnetic tapes), optical media (e.g., compact disc-read only memories (CD-ROMs) or digital versatile discs (DVDs)), magneto-optical media (e.g., floptical discs), and hardware devices that are specially configured to store and carry out program commands (e.g., ROMs, random-access memories (RAMs), or flash memories). Program commands may include, for example, high-level language code that can be executed by a computer using an interpreter, as well as machine language code made by a compiler.

In an embodiment, a remote control device and a method thereof may collective-control driving, monitoring, shooting, etc. of a plurality of mobile objects displayed on a single operating device with the eyes of a single operator.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:
1. A remote control device comprising:
a display configured to receive a driving image and a monitoring image from each of N mobile robots, such that N driving images and M monitoring images are received, and to display the received N driving images and M monitoring images;

a sensor configured to track a gaze of a user; and a controller comprising at least one processor, the controller configured to:

provide a control right to the user for a first robot of the N mobile robots as a master mobile robot based on the gaze of the user being tracked by the sensor as staying on the driving image or the monitoring image of the first robot displayed on the display; and based on the user selecting, via the display, one of the N driving images or one of the M monitoring images, other than the driving image and the monitoring image of the first robot that is the master mobile robot, within a certain time after the user is provided the control right of the master mobile robot, perform collective control of the master mobile robot and another mobile robot from which the selected driving image or the selected monitoring image was received, wherein the controller is configured to provide the control right to the user for the first robot as the master mobile robot at a time t1 based on the gaze of the user being tracked by the sensor as staying on a first image that is the driving image or the monitoring image of the first robot displayed on the display, and when the gaze of the user tracked by the sensor at a time t2 moves and stays for more than a preset time on a second image that is the driving image or the monitoring image of a second robot of the N mobile robots displayed on the display, set the second robot as the master mobile robot.

2. The remote control device of claim 1, wherein the display is configured to:

when the gaze of the user is tracked by the sensor as staying on the driving image of the first robot displayed on the display, provide an interface to the user to select one of the N driving images, other than the driving image from the first robot that is the master mobile robot.

3. The remote control device of claim 2, wherein the controller is configured to perform the collective control of the master mobile robot and the another mobile robot, corresponding to the driving image selected via the interface, such that the master mobile robot and the another mobile robot move to a point corresponding to where the gaze of the user is tracked by the sensor moves on the driving image of the master mobile robot that is displayed on the display.

4. The remote control device of claim 2, wherein the controller is configured to collectively control driving of the master mobile robot and the another mobile robot, corresponding to the driving image selected via the interface, based on an input from a joystick.

5. The remote control device of claim 1, wherein the display is configured to:

when the gaze of the user is tracked by the sensor as staying on the monitoring image of the first robot displayed on the display, provide an interface to the user to select one of the M monitoring images, other than the monitoring image from the first robot that is the master mobile robot.

6. The remote control device of claim 5, wherein the controller is configured to perform the collective control of the master mobile robot and the another mobile robot, corresponding to the monitoring image selected via the interface, such that the master mobile robot and the another mobile robot move to a point corresponding to where the gaze of the user is tracked by the sensor moves on the monitoring image of the master mobile robot that is displayed on the display.

7. The remote control device of claim 5, wherein the controller enables the master mobile robot and the another mobile robot, corresponding to the monitoring image selected via the interface, to perform shooting in a collective control method using a joystick.

8. The remote control device of claim 1, wherein the controller is configured to:

revoke the control right of the first robot, at the time t2, based on one of the first image of the first robot and the second image of the second robot being a driving image and the other of the first image of the first robot and the second image of the second robot being a monitoring image, and maintain collective control rights of the first robot and the second robot, at the time t2, based both of the first image of the first robot and the second image of the second robot being a same type from among a driving image and a monitoring image.

9. The remote control device of claim 1, wherein the controller causes the display to display identification information indicating each of the N driving images and each of the M monitoring images displayed on the display that correspond to the master mobile robot or the another mobile robot of which the controller performs the collective control.

10. The remote control device of claim 1, wherein the controller is configured to determine the one of the N driving images or the one of the M monitoring images is selected by the user based on the user touching the display.

11. A remote control method comprising:

receiving a driving image and a monitoring image from each of N mobile robots, such that N driving images and M monitoring images are received;

displaying, on a display, the received N driving images and M monitoring images;

tracking, via a sensor, a gaze of a user;

providing a control right to the user for a first robot of the N mobile robots as a master mobile robot based on the gaze of the user being tracked by the sensor as staying on the driving image or the monitoring image of the first robot displayed on the display; and performing, based on the user selecting, via the display, one of the N driving images or one of the M monitoring images, other than the driving image and the monitoring image of the first robot that is the master mobile robot, within a certain time after the user is provided the control right of the master mobile robot, collective control of the master mobile robot and another mobile robot from which the selected driving image or the selected monitoring image was received, wherein the providing the control right to the user for the first robot as the master mobile robot is at a time t1, and the remote control method further comprises: setting, in a case where the gaze of the user tracked by the sensor moves and stays at a time t2 for more than a preset time on the driving image or the monitoring image of a second robot of the N mobile robots displayed on the display, the second robot as the master mobile robot.

12. The remote control method of claim 11, further comprising:

activating, in a case where the gaze of the user is tracked by the sensor as staying on the driving image of the first robot displayed on the display, a first interface to the user to select one of the N driving images, other than the driving image from the first robot that is the master mobile robot; and activating, in a case where the gaze of the user is tracked by the sensor as staying on the monitoring image of the first robot displayed on the display, a second interface to the user to select one of the M monitoring images, other than the monitoring image from the first robot that is the master mobile robot.

13. The remote control method of claim 12, further comprising performing collective control of the master mobile robot and the another mobile robot, corresponding to the driving image selected via the first interface, such that the master mobile robot and the another mobile robot move to a point corresponding to where the gaze of the user is tracked by the sensor moves on the driving image of the master mobile robot that is displayed on the display.

14. The remote control method of claim 12, further comprising performing collective control of the master mobile robot and the another mobile robot, corresponding to the monitoring image selected via the second interface, such that the master mobile robot and the another mobile robot shoot a point corresponding to where the gaze of the user is tracked by the sensor moves on the driving image of the master mobile robot that is displayed on the display.

15. A non-transitory computer readable medium comprising computer instructions that are configured to, when executed by at least one processor, cause the at least one processor to:

display, via a display, N driving images and M monitoring images that are received, the N driving images and M monitoring images including a driving image and a monitoring image from each of N mobile robots;

track, via a sensor, a gaze of a user;

provide a control right to the user for a first robot of the N mobile robots as a master mobile robot based on the gaze of the user being tracked by the sensor as staying on the driving image or the monitoring image of the first robot displayed on the display; and perform, based on the user selecting, via the display, one of the N driving images or one of the M monitoring images, other than the driving image and the monitoring image of the first robot that is the master mobile robot, within a certain time after the user is provided the control right of the master mobile robot, collective control of the master mobile robot and another mobile robot from which the selected driving image or the selected monitoring image was received, wherein the computer instructions are further configured to cause the at least one processor to provide the control right to the user for the first robot as the master mobile robot at a time t1 based on the gaze of the user being tracked by the sensor as staying on a first image that is the driving image or the monitoring image of the first robot displayed on the display, and when the gaze of the user tracked by the sensor at a time t2 moves and stays for more than a preset time on a second image that is the driving image or the monitoring image of a second robot of the N mobile robots displayed on the display, set the second robot as the master mobile robot.

16. The non-transitory computer readable medium of claim 15, wherein the computer instructions are further configured to, when executed by the at least one processor, cause the at least one processor to:

activate, in a case where the gaze of the user is tracked by the sensor as staying on the driving image of the first robot displayed on the display, a first interface to the user to select one of the N driving images, other than the driving image from the first robot that is the master mobile robot; and activate, in a case where the gaze of the user is tracked by the sensor as staying on the monitoring image of the first robot displayed on the display, a second interface to the user to select one of the M monitoring images, other than the monitoring image from the first robot that is the master mobile robot.

17. The non-transitory computer readable medium of claim 16, wherein the computer instructions are further configured to, when executed by the at least one processor, cause the at least one processor to:

perform the collective control of the master mobile robot and the another mobile robot, corresponding to the driving image selected via the first interface, such that the master mobile robot and the another mobile robot move to a point corresponding to where the gaze of the user is tracked by the sensor moves on the driving image of the master mobile robot that is displayed on the display.

18. The non-transitory computer readable medium of claim 16, wherein the computer instructions are further configured to, when executed by the at least one processor, cause the at least one processor to:

perform the collective control of the master mobile robot and the another mobile robot, corresponding to the monitoring image selected via the second interface, such that the master mobile robot and the another mobile robot shoot a point corresponding to where the gaze of the user is tracked by the sensor moves on the driving image of the master mobile robot that is displayed on the display.

* * * * *